P. M. TAYLOR.
FLUID CHECK FOR TRAVELING CARRIAGES.
APPLICATION FILED DEC. 29, 1919.
1,355,365.
Patented Oct. 12, 1920.
2 SHEETS—SHEET 2.
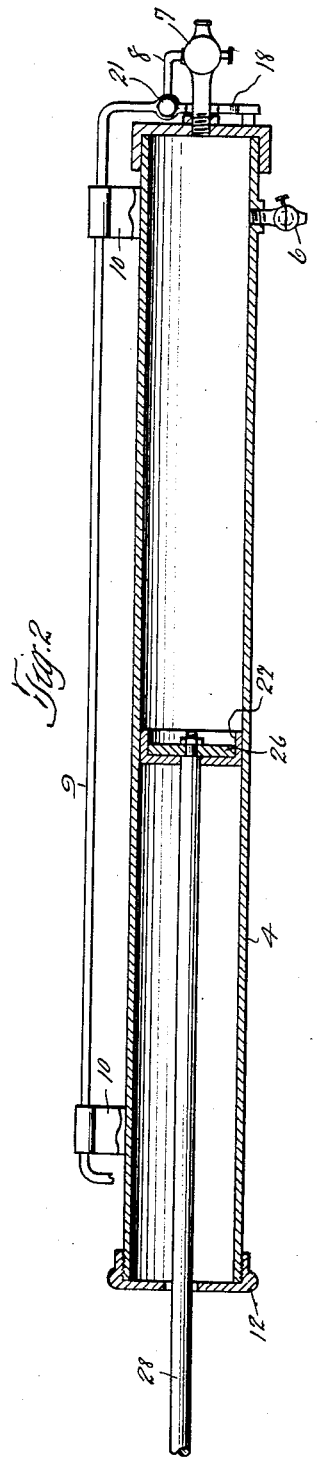
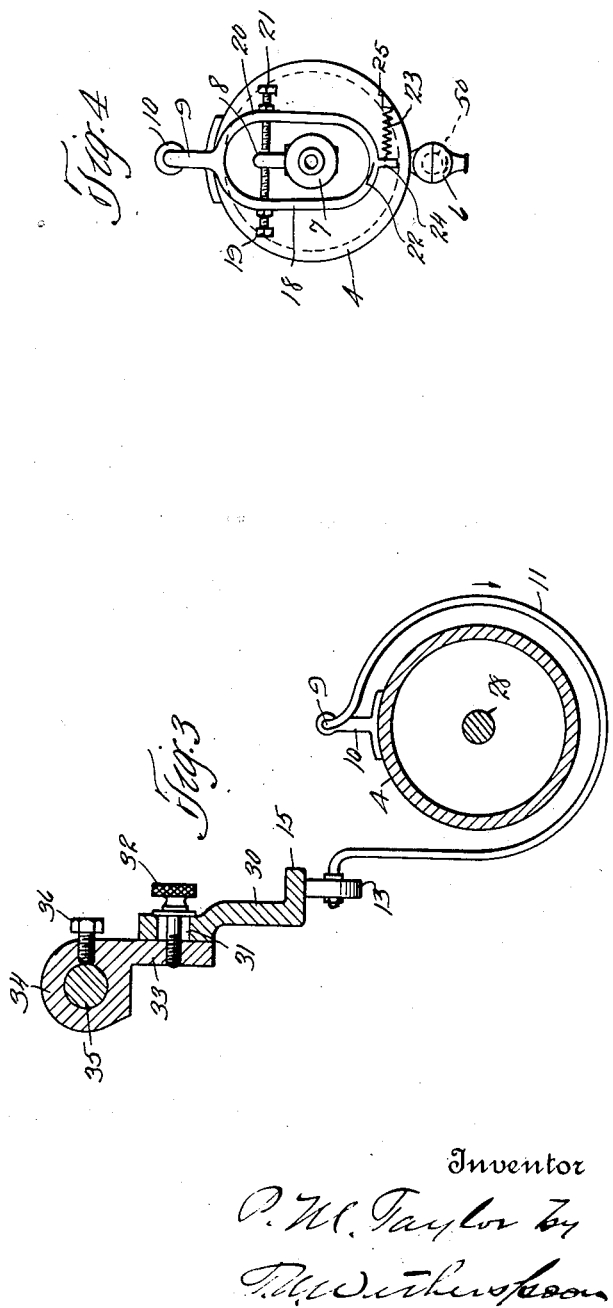
Inventor
P. M. Taylor by
Attorney

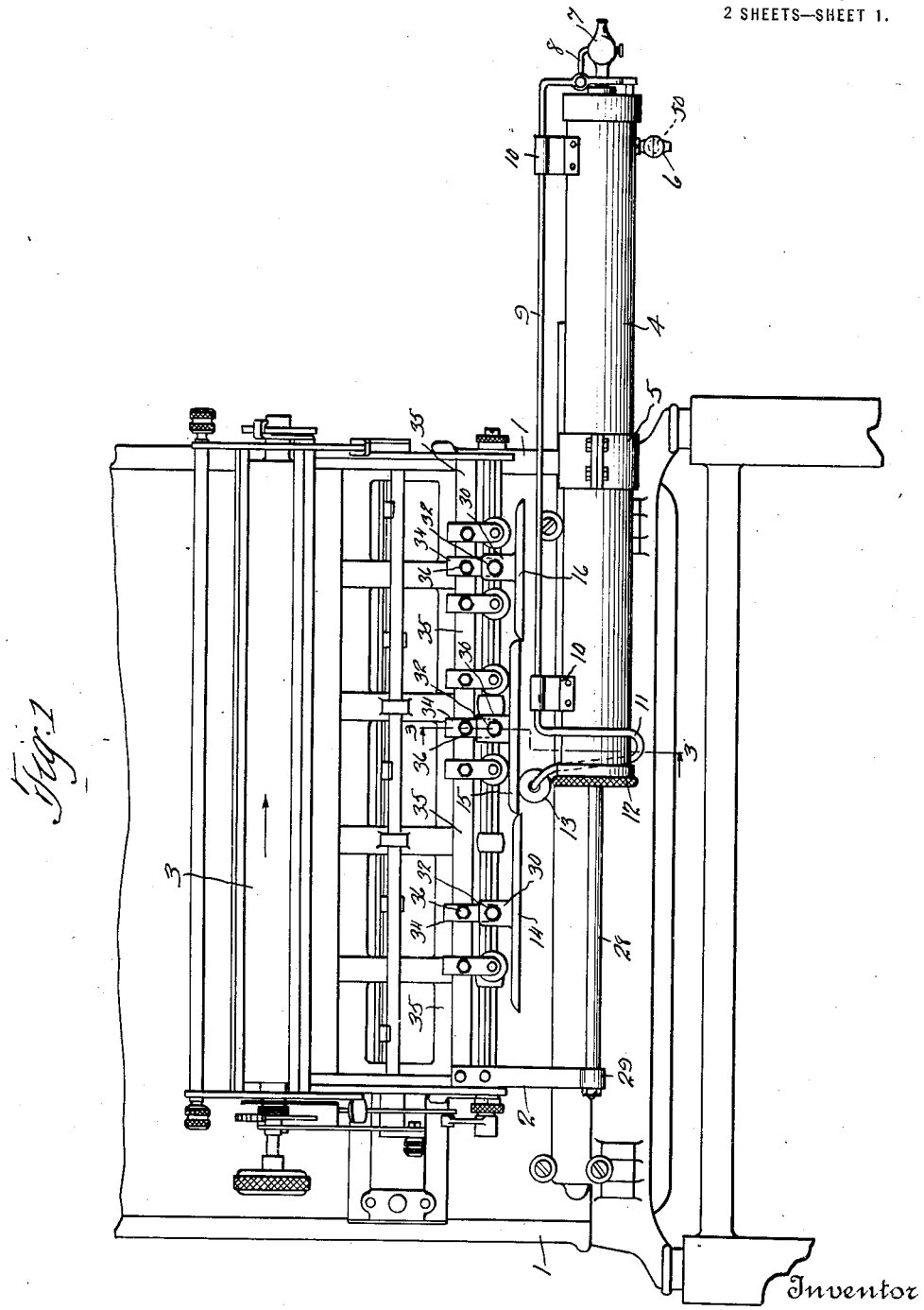

UNITED STATES PATENT OFFICE.

PATILLO M. TAYLOR, OF EASLEY, SOUTH CAROLINA.

FLUID CHECK FOR TRAVELING CARRIAGES.

1,355,365.　　　　　Specification of Letters Patent.　　Patented Oct. 12, 1920.

Application filed December 29, 1919. Serial No. 348,102.

*To all whom it may concern:*

Be it known that I, PATILLO M. TAYLOR, a citizen of the United States, residing at Easley, in the county of Pickens and State of South Carolina, have invented certain new and useful Improvements in Fluid Checks for Traveling Carriages; and I do hereby declare the following to be a full, clear, and exact description of the invention, such as will enable others skilled in the art to which it appertains to make and use the same.

This invention relates to fluid checks for calculating machines and the like and has for its object to provide a device of this character which will be simple in construction, comparatively inexpensive to manufacture, and more efficient in action than those heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1 is a diagrammatic elevational view of a device made in accordance with this invention, applied to the carriage of an adding machine:

Fig. 2 is a central longitudinal sectional view of a portion of the parts shown in Fig. 1;

Fig. 3 is a fragmentary cross sectional view, taken approximately on the line 3—3 of Fig. 1, looking in the direction of the arrow; and Fig. 4 is a diagrammatic end elevational view of the parts shown in Fig. 2.

1 indicates any suitable framework of a calculating machine, 2 the carriage thereof, 3 the platen and 4 a recoil or shock absorbing cylinder secured to the back of the frame 1, as by the collar 5. Said cylinder 4 is provided with a valved inlet or connection 6 near one end and with a pet cock or outlet 7 in the extreme end thereof, the valve stem 8 of the plug of which is carried by the bent operating rod 9 passing through the guides 10 mounted on the cylinder 4 and curved as at 11, to pass around and underneath the end 12 of the cylinder 4, in order that the roller 13 with which it is provided may contact with the plurality of plates 14, 15, and 16 for a purpose which will be presently disclosed.

The extreme end of the rod 9 is bifurcated as best shown in Fig. 4, and through one member 18 of the bifurcation there passes an adjustable screw means 19 adapted to contact with the stem 8 of the plug of the pet cock, while through the other member 20 of the bifurcation passes a similar screw means 21 so that by properly setting the screws 19 and 21 any small amount of lost motion that may be desired in the connection between the rod 9 and stem 8 may be had. The members 18 and 20 meet at the point 22, and are provided with a spring 23 secured at one end to the lug 24, and at its other end to the cylinder 4 as at the point 25. The outlet 6 is provided with a ball valve 50 adapted to lift when a vacuum is in the cylinder 4, and to close when a pressure exists therein, in the manner well understood. Traveling back and forth inside the cylinder 4 is the piston 26 preferably provided with the cup-shaped member 27 and with the piston rod 28. Said piston rod 28 is secured to the carriage 2 of the machine as at the point 29, and therefore, causes the piston 26 to move backward and forward with the carriage inside the cylinder 4, as will be readily understood from the drawings.

The plates 14, 15 and 16 are provided with right angular extensions 30, and said extensions 30 are provided with the slots 31 through which the adjustable fastening means 32 pass, so as to firmly hold said plates against the flange 33 of the members 34 secured to the rod 35 as by the screw means 36 with which the carriage 2 is provided.

The operation of this invention will be understood from what follows:—It is well known that when the typewriter or adding machine, or a similar instrumentality is operated the carriage moves a predetermined distance, and usually emits a click which is more or less annoying to people around. Various devices have been heretofore proposed to kill or destroy this noise without success, and upon investigating the subject I have found that if a cushioning cylinder such as 4 is provided, and nothing else, although the click will be killed or absent over certain portions of travel of the carriage, yet it will inevitably appear over other portions thereof. The cause for this is no doubt due to the friction of the parts varying over different portions of the travel of the carriage and therefore, although a cushioning device may destroy the click at one part of the travel of the carriage, yet it will not destroy it at another part of the travel of the carriage.

Stated in other language, a cylinder such as 4 provided with the pet cock such as 7, and a piston such as 26 would drive air out of the pet cock 7 at each portion of the travel of the carriage and since the pet cock would have a uniform opening, the amount of resistance offered to the piston 26 would be uniform so that if the carriage possesses more force during one portion of its travel than during another, it could and does emit a click owing to the insufficient restriction of the pet cock 7, corresponding to the greater force of the carriage. On the other hand, if the pet cock 7 is restricted to such an extent as to kill the loudest click it would be found to be too restricted to permit the carriage to move smoothly over those portions of its travel which emit a less loud click. To avoid these objections I have provided the rod 9 and the plates 14, 15 and 16, which serve to vary the restriction in the pet cock 7, and thus to accommodate the resistance in the cylinder 4 to the different forces or energies which accompany different movements of the carriage over its path of travel. That is to say, if all the plates 14, 15 and 16 are in the same horizontal plane, the spring 23 will rotate the rod 9 in the bearings 10, maintain the roller 13 against said plates with a substantially uniform pressure, and the plug 8 of the pet cock 7 will be maintained with a substantially constant restriction so that if the carriage does not vary in its energy or forces over different portions of its travel, the piston 26 and cylinder 4 will act as a substantially uniform cushioning device.

In such a case the resistance offered to the piston 26 will be uniform, the clicks will be substantially uniform and they could all be killed by a single adjustment of the pet cock 7 through the proper adjustments of the plates 14, 15 and 16. But, suppose that said energy inherent in the carriage varies as above stated. Then all one has to do is to find out over what portion of the path of travel the loudest clicks come and then to so adjust the particular plate 14, 15 or 16, as will cause a greater restriction of the pet cock 7 at that point than at other points of the travel of said carriage. For example, supposing that over the middle of the path of travel the energy producing the clicks is greater than over each end of the path of travel, then the plate 15 may be so adjusted as will cause through the roller 13 and the rod 9, and stem 8, a greater resistance of the air through the pet cock 7 than is caused by the adjustment of the plates 14 and 16.

If it should be found that over those portions of travel of the carriage which correspond to the ends of one or more of the plates 14, 15 and 16, the clicks are of a different intensity than the clicks corresponding to the other portions of the plate, then it is a simple matter to even incline the plates 14, 15 and 16 in such a direction as will cause a different turning of the rod 9 in its bearings, and therefore a different pressure on the roller 13, and a different opening of the plug of the pet cock 7.

In all cases, the ball valve 50 will rise when the piston 26 approaches the end 12 of the cylinder 4, and thus the said cylinder will be filled with air after each return stroke of the carriage, which air can only be expelled through the pet cock 7 on account of the ball valve 50 falling and closing the outlet 6 when the carriage returns.

It will now be clear that by adjustably connecting the rod 9 to the valve stem 8, and pivoting said rod longitudinally in the bearings 10, I am enabled by means of the adjustable plates 14, 15, and 16 and roller 13 to vary automatically the opening in the pet cock at different portions of the travel of the carriage 2, for I provide corresponding variations in the resistance to the travel of the said carriage. The result is I can effectually stop the objectionable clicks that have been heretofore emitted by such carriages.

It is obvious that those skilled in the art may vary the details of construction as well as the arrangement of parts without departing from the spirit of the invention, and therefore, I do not wish to be limited to the above disclosure except as may be required by the claims.

What is claimed is:—

1. In a cushioning means for traveling carriages of the character described, the combination of a cylinder; a piston in said cylinder; a valved inlet communicating with said cylinder; a valved outlet for said cylinder; and means controlled by the movements of said carriage for automatically governing said outlet, substantially as described.

2. In a cushioning means for traveling carriages of the character described, the combination of a cylinder; a piston in said cylinder; a valved inlet communicating with said cylinder; a valved outlet for said cylinder; and means comprising a pivoted rod and connections controlled by the movements of said carriage for automatically governing said outlet, substantially as described.

3. In a cushioning means for traveling carriages of the character described, the combination of a cylinder; a piston in said cylinder; a valved inlet communicating with said cylinder; a valved outlet for said cylinder; and means comprising a pivoted adjustable member on said carriage and connections with said valved outlet, controlled by the movements of said carriage for automatically governing said outlet, substantially as described.

4. In a cushioning means for carriages of calculating machines, the combination of a cushioning cylinder having a valved outlet; adjustable means carried by said carriage; and pivoted connections between said outlet and adjustable means, substantially as described.

5. In a cushioning means for carriages of calculating machines, the combination of a cushioning cylinder having a valved outlet; adjustable means comprising a plurality of plates carried by said carriage; and pivoted connections comprising a rod having a roller contacting with said plates between said outlet and adjustable means, substantially as described.

6. In a cushioning means for carriages of calculating machines, the combination of a cushioning cylinder; an outlet provided with a valve stem for said cylinder; a longitudinally pivoted rod adjustably connected with said stem; a plurality of independently adjustable plates carried by said carriage; means on said rod for contacting with said plates during the travel of said carriage; and a piston in said cylinder controlled by said carriage, substantially as described.

In testimony whereof I affix my signature.

PATILLO M. TAYLOR.